United States Patent [19]

Bauman

[11] Patent Number: 4,590,222

[45] Date of Patent: May 20, 1986

[54] LOWER DENSITY SILICONE ELASTOMERIC FOAM

[75] Inventor: Therese M. Bauman, Midland, Mich.

[73] Assignee: Dow Corning Corporation, Midland, Mich.

[21] Appl. No.: 787,852

[22] Filed: Oct. 16, 1985

[51] Int. Cl.$^4$ .................................................. C08J 9/02
[52] U.S. Cl. .................................... 521/88; 521/91; 521/110; 521/117; 521/134; 521/154; 528/15; 528/31; 528/32
[58] Field of Search ............. 528/15, 31, 32; 521/88, 521/91, 110, 117, 134, 154

[56] References Cited

U.S. PATENT DOCUMENTS

| | | | |
|---|---|---|---|
| 3,070,555 | 12/1962 | Bruner | 521/127 |
| 3,425,967 | 2/1969 | Modic | 521/119 |
| 3,428,580 | 2/1969 | Nitzche et al. | 521/124 |
| 3,923,705 | 12/1975 | Smith | 521/154 |
| 4,026,843 | 5/1977 | Kittle | 521/88 |
| 4,026,845 | 5/1977 | Kim et al. | 521/154 |
| 4,189,545 | 2/1980 | Modic | 521/154 |
| 4,418,157 | 11/1983 | Modic | 521/134 |

FOREIGN PATENT DOCUMENTS 2065661 7/1981 United Kingdom .

Primary Examiner—Morton Foelak
Attorney, Agent, or Firm—Edward C. Elliott

[57] ABSTRACT

This invention discloses a method of controlling the relative physical properties of foams such as density and compressibility or density and Bashore resiliency for compositions which consist essentially of triorganosiloxy endblocked polydiorganosiloxane having at least two vinyl radicals, platinum catalyst, organohydrogensiloxane, and hydroxyl endblocked polydiorganoisiloxane. The relative values of the physical properties are adjusted by the addition of varying amounts of organic alcohol having from 3 to 12 carbon atoms to the composition.

6 Claims, No Drawings

LOWER DENSITY SILICONE ELASTOMERIC FOAM

BACKGROUND OF THE INVENTION

FIELD OF THE INVENTION

This invention relates to silicone compositions which form room temperature curing, elastomeric foam upon being mixed together.

BACKGROUND INFORMATION

Bruner teaches in U.S. Pat. No. 3,070,555, issued Dec. 25, 1962, a method of preparing a siloxane elastomeric foam which comprises mixing (1) an organopolysiloxane containing silicon-bonded OH groups and from 1 to 75 percent by weight of siloxane units containing at least one silicon-bonded hydrogen atom, (2) up to 50 percent by weight based upon (1) of a hydroxylated compound selected from the group consisting of silanols, low molecular weight hydroxylated siloxanes, water, carboxylic acids, and alcohols of less than 12 carbon atoms, and (3) a stannous salt of a hydrocarbon-soluble monocarboxylic acid. The specific catalyst is said to cause reaction of the ingredients at the correct rate to cause both foaming and crosslinking to occur.

Nitzsche et al., in U.S. Pat. No. 3,428,580, issued Feb. 18, 1969, teach a self-extinguishing silicone resin foam consisting essentially of (1) an organosiloxane polymer free of hydrogen to silicon bonds that is resinous in nature, (2) a fluid organohydrogen siloxane polymer, (3) a hydroxyl group containing compound, and a catalyst. Hydroxylated compounds include low molecular weight organosiloxanols, water, organic alcohols, alkanolamines, and hydroxy carboxylic esters. Catalysts can be any quaternary ammonium compounds or carboxylic acid salts of a heavy metal, preferably divalent tin.

Smith disclosed in U.S. Pat. No. 3,923,705, issued Dec. 2, 1975, a method of preparing an organosiloxane foam by mixing together an organohydrogen siloxane having at least three silicon-bonded hydrogen atoms per molecule, a hydroxylated organosiloxane, and a platinum catalyst. The molar ratio of silicon-bonded hydrogen atoms to silicon-bonded hydroxyl radicals was between 2.5 to 40 and the viscosity of the mixture was less than 100,000 cs. at 25° C. He also disclosed the use of up to 85 percent by weight of a benzene-soluble, vinyl containing, triorganosiloxy endblocked polydiorganosiloxane. The foam was fire retardant and non-toxic.

In U.S. Pat. No. 4,026,843, issued May 31, 1977, Kittle disclosed a silicone foam composition that had a thin skin due to the presence of an organic alcohol in a composition containing a polydiorganosiloxane gum base stock, an organohydrogensiloxane, an acetylenic alcohol inhibitor, and a platinum catalyst. This composition was a one-part material which could be prepared and stored, the composition foamed when heated to provide a foam or sponge product.

A silicone foam composition is disclosed by Modic in U.S. Pat. No. 4,189,545, issued Feb. 19, 1980, that comprises a vinyl-containing polysiloxane, optionally a filler, less than 1.5 percent water, a hydrogen-containing polysiloxane, and a platinum catalyst. He teaches that the ingredients of foamable compositions must be balanced so that the release of hydrogen occurs at the proper rate to produce a foam with a proper density.

United Kingdom Patent Application No. 2,065,661, published July 1, 1981, by Modic discloses a silicone composition comprising a base vinyl containing polymer, a silanol-containing silicone compound, optional filler, a silicone hydride polymer, and a platinum catalyst. He teaches that his composition of U.S. Pat. No. 4,189,545, noted above, suffered in that the water would separate from the mixture on standing. In '661, he teaches that the silanol groups on the silicone compound react with the hydride to produce the hydrogen that forms the foam. He teaches there must be a silicone compound and it must have silanol groups. The silanol groups in silicone resin will not function nor will the silanol groups on silica. More than 10 parts by weight of the silanol containing silicone compound produces too much hydrogen gas that may result in large voids in the system. There is also at least 1 mol of SiH per mole of silanol.

In U.S. Pat. No. 4,418,157, issued Nov. 29, 1983, Modic discloses a method of reducing the density of foam by mixing a resinous copolymer with a foamable silicone composition.

SUMMARY OF THE INVENTION

A method of producing an elastomeric foam having a desired combination of physical properties adds an organic alcohol having from 3 to 12 carbon atoms to a mixture of triorganosiloxy endblocked polydiorganosiloxane having at least two vinyl radicals per molecule, trialkylsiloxy endblocked polyalkylhydrogensiloxane, hydroxylated organosiloxane, and platinum catalyst. When mixed, the composition forms a froth which cures at room temperature into a closed-cell foam.

DESCRIPTION OF THE INVENTION

This invention relates to a method of controlling a combination of physical properties of a silicone elastomeric foam consisting essentially of (A) mixing (1) 100 parts by weight of triorganosiloxy endblocked polydiorganosiloxane having a viscosity in the range of 20 to 40 Pa.s at 25° C. and at least two vinyl radicals per molecule, (2) from 0 to 40 parts by weight of a benzene soluble resin copolymer of triorganosiloxy and $SiO_2$ units where the triorganosiloxy units are trimethylsiloxy units and dimethylvinyl units and the mol ratio of triorganosiloxy units to $SiO_2$ units is about 0.7 to 1 and the copolymer has from 1.4 to 2.2 weight percent silicon-bonded vinyl radical, (3) from 5 to 200 parts by weight of platinum per million parts by weight of polydiorganosiloxane (1) as catalyst, (4) from 5 to 10 parts by weight of organohydrogensiloxane having an average of at least 3 silicon-bonded hydrogen atoms per molecule and an average of no more than one silicon-bonded hydrogen atom per silicon atom, (5) from 20 to 40 parts by weight of hydroxyl endblocked polydiorganosiloxane having from 2 to 4 weight percent hydroxyl radical, (6) from 0 to 100 parts by weight of filler, and then (B) adding (7) from 1 to 15 parts by weight of organic alcohol having from 3 to 12 carbon atoms to change the ratio of density to compressibility of the resultant foam, the mixture having a viscosity of less than 100 Pa.s at 25° C., and then (C) allowing the mixture to produce a froth and cure at room temperature into a closed-cell, elastomeric silicone foam.

Elastomeric foams are being used in many different types of applications such as packaging, sound absorption, sealing, as firestop sealants, and as cushioning in such diverse applications as shoes, automobiles, bicycle seats, and so forth. Each different type of application can require a different type of combination of physical properties such as density, hardness, elongation, resiliency, penetration, cell size, and whether open or closed cell.

One of the types of foam that is used is made from combinations of trialkylsiloxy endblocked polydiorganosiloxane having at least two vinyl radicals per molecule, trialkylsiloxy endblocked polyalkylhydrogensiloxane, hydroxylated organosiloxane, and platinum catalyst. When mixed in the proper proportions, such a mixture liberates hydrogen at a sufficient rate to cause the mixture to form a froth and to cure at the same time so that a foam is produced. By varying the amount of ingredients and the actual ingredients that are used in the mixture, it is possible to have an effect upon the physical properties of the finished foam and upon the relative values of these properties. For example, it might be desirable to lower the density of the foam but still maintain the same stiffness. Another application might require a certain stiffness or penetration in order to support an object sitting on the foam but need a higher or lower amount of energy absorbed when the combination is vibrated, as in a package being transported by truck over a bumpy road. It has been discovered that the relative values of physical properties of such a silicone foam can be adjusted by the addition of varying amounts of organic alcohol having from 3 to 12 carbon atoms.

The triorganosiloxy endblocked polydiorganosiloxane having a viscosity in the range of 20 to 40 Pa.S at 25° C. and at least two vinyl radicals per molecule (1) is a well known material. Preferred are vinyl endblocked polydiorganosiloxanes of the formula

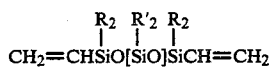

where R and R' are selected from the group consisting of alkyl radicals having from 1 to 6 carbon atoms per radical, phenyl radical, and vinyl radical with at least 50 mol percent of the R' radicals being methyl radicals.

The benzene soluble resin copolymer (2) is a well known material. The resin is a copolymer of triorganosiloxy and SiO$_2$ units where the triorganosiloxy units are trimethylsiloxy units and dimethylvinylsiloxy units and the mole ratio of triorganosiloxy units to SiO$_2$ units is about 0.7 to 1 and the copolymer has from 1.4 to 2.2 weight percent of siliconbonded vinyl radical. The manufacture of this material is described in U.S. Pat. No. 2,676,182, issued Apr. 20, 1954, to Daudt and Tyler, which patent is hereby incorporated by reference to show the method of manufacture.

A platinum catalyst is included in the composition to accelerate the reaction between the ingredients. The platinum catalyst (3) can be any of the known forms used for catalyzing the reaction of allyl groups on silicon or hydroxyl groups on silicon with hydrogen on silicon. A preferred form of platinum is a chloroplatinic acid catalyst complex as prepared by the method described in U.S. Pat. No. 3,419,593, issued Dec. 31, 1968, to Willing, which is hereby incorporated by reference, wherein chloroplatinic acid is mixed with symmetrical divinyltetramethyldisiloxane to provide the complex.

Ingredient (4) is an organohydrogensiloxane having an average of at least 3 silicon-bonded hydrogen atoms per molecule and an average of no more than one silicon-bonded hydrogen atom per silicon atom. The remaining valences of the silicon atoms are satisfied by divalent oxygen atoms or by monovalent alkyl radicals having from 1 to 6 carbon atoms per radical, such as methyl, ethyl, propyl, isopropyl, butyl, and hexyl, and phenyl radicals. The organohydrogensiloxanes can be homopolymers, copolymers, and mixtures thereof. Preferably, the organohydrogensiloxane is a copolymer of trimethylsiloxy and methylhydrogensiloxane or a copolymer of trimethylsiloxy, methylhydrogensiloxane and dimethylsiloxane. Preferably, the organohydrogensiloxanes have an average of at least five silicon-bonded hydrogen atoms per molecule.

Ingredient (5) is a hydroxyl endblocked polydiorganosiloxane having from 2 to 4 weight percent hydroxyl radical. The siloxane has the formula

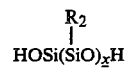

where R is as defined above. The preferred R is methyl. The value of x determines the weight percent hydroxyl radical of the siloxane.

Ingredient (6) is filler. This is an optional ingredient in that it is not required to produce a foam, but it is preferred that filler be present to reinforce the polydiorganosiloxane. Suitable fillers include those fillers well know for use with silicone elastomers, such as fume silica, diatomacious earth, crushed quartz, zinc oxide, calcium carbonate, and fibrous potassium titanate. The amount of filler used is dependent to some extent on the viscosity of the mixture. Because the finished mixture must be of a low enough viscosity for the foam to form when the hydrogen is generated, only a low amount of a highly reinforcing filler such as fume silica can be used. When a non-reinforcing filler such as ground quartz is used, relatively large amounts may be added because it does not increase the viscosity as rapidly as does the reinforcing fillers.

Ingredient (7) is an organic alcohol having from 3 to 12 carbon atoms, such as, isopropyl, octyl, and lauryl alcohols, propylene glycol, and 2-ethylhexanediol. These alcohols are thought to react with the hydrogen atoms on silicon in the presence of the platinum catalyst to generate additional hydrogen gas. When the alcohol is a monohydroxyl alcohol, there would be no corresponding crosslink formed, so the resulting foam would tend to have fewer crosslinks than if the alcohol was not present. If the alcohol is a polyhydroxyl alcohol it would be expected that the reaction could form crosslinks, but they would be of a different kind from those formed by the reaction between the hydrogen atoms on silicon and the vinyl radicals or hydroxyl radicals on silicon. It is speculated that these different types of crosslinks, or no crosslink, formed when the alcohol is added to the composition causes the different changes in the physical properties which are evident, as in the examples shown below.

The effect of the addition of the alcohol depends upon the alcohol used and the amount. For example, when additional amounts of isopropanol were added, the density of the resulting foam decreased. However, when used at the same level of hydroxyl radical, lauryl alcohol produced a much lower density than when isopropyl alcohol was used. In a cushioning application, the addition of lauryl alcohol produced a foam which exhibited a minimum penetration when a load was applied at a level of 0.5 parts of alcohol per 110 parts of composition, showing a greater amount of penetration at amounts of alcohol both above and below that amount. The hardness of the foam did not change in the same manner however; the hardness decreased as the amount of alcohol used was increased.

The method of this invention combines the ingredients into a uniform mixture and then allows the mixture to form a froth at room temperature and pressure. When mixed together, the ingredients react to give off hydrogen gas, which causes the mixture to form a froth. At the same time that the hydrogen gas is given off, the mixture polymerizes and crosslinks to form an elastomeric foam. When the ingredients (1), (3), and (4) are combined, hydrogen gas is given off. Foam can be produced in a continuous manner by use of continuous mixing devices which continuously meter each ingredient into a mixing chamber in the proper ratio, continuously mix, and continuously discharge the mixture into a container or onto a belt where the foam is formed.

The method of this invention can also be practiced by combining the ingredients into two or more parts for storage purposes, then combining the parts at the time the foam is desired. Preferred are two parts in which the vinyl-containing polydiorganosiloxane (1), and the platinum catalyst (3) are combined in one part and the organohydrogensiloxane (4), the hydroxyl endblocked polydiorganosiloxane (5), and the organic alcohol (7) are combined in the other part. The two parts can be easily stored because there is little reaction between the ingredients of each part. When the two parts are mixed together, the reaction discussed above takes place and the foam is formed. For best shelf life, it is preferred not to have the platinum catalyst and the organohydrogensiloxane together in the same package.

Additional ingredients can be added to the foam, but they should first be evaluated to ensure that they do not effect the physical property profile being sought through the use of this invention. A platinum catalyst inhibitor, such as methylvinylcyclosiloxane, can be used to slow the reaction rate so that mixing can be completed before the mixture starts to form a froth. Pigments can be added to color the foam. The addition of carbon black will improve the flame retardancy of the foam.

The following examples are presented for illustrative purposes and should not be construed as limiting the present invention which is properly delineated in the claims.

All parts are parts by weight.

EXAMPLE 1

A first composition was prepared by mixing together 46.5 parts of a dimethylvinylsiloxy endblocked polydimethylsiloxane siloxane having a viscosity of about 30 Pa.s at 25° C., 16 parts of benzene soluble resin copolymer of triorganosiloxy units and $SiO_2$ units in the mole ratio of about 0.7 mole of triorganosiloxy unit per mole of $SiO_2$ unit where the triorganosiloxy units are trimethylsiloxy units and dimethylvinylsiloxy units so that the resin copolymer has about 1.8 weight percent vinyl radicals, 37.5 parts of ground quartz having an average particle diameter of about 5 micrometres, and 0.13 part of a platinum catalyst comprising a chloroplatinic acid complex of divinyltetramethyldisiloxane and polydimethylsiloxane fluid to provide 0.7 weight percent platinum in the catalyst.

A second composition was prepared by mixing together 4 parts of a hydroxyl endblocked polydimethylsiloxane having a viscosity of about 0.04 Pa.s at 25° C.
and a hydroxyl content of about 3.25 weight percent and 1 part of a trimethylsiloxy endblocked polymethylhydrogensiloxane having a silicon-bonded hydrogen atom content of about 1.6 weight percent.

A series of samples were prepared by mixing 100 g of the first composition with the amount and type of additive shown in Table I. Each of these mixtures was then mixed with 18 g of the second composition for 30 to 60 seconds and the mixture was allowed to froth and cure to a foam at room temperature.

Samples were removed from each of the closed-cell foams and measured for density, compressibility and Bashore resiliency with the results shown in Table I. The addition of alcohol lowered the density of the foam to varying degrees. The compositions all contained a copolymer resin, such as suggested by Modic, in U.S. Pat. No. 4,418,157, as a method of reducing the density of foam. The force required to compress the foam was also lowered, but to varying degrees. For example, the octyl alcohol lowered the compressibility to 30 percent of that of the control while lowering the density to about 25 percent of the control. At a comparable level, isopropanol lowered the compressibility to 95 percent of the control while the density was lowered to 85 percent of the control.

TABLE I

| Alcohol | Amount gms | Amount mol OH | Density kg/m³ | Compressibility kPa | Bashore |
|---|---|---|---|---|---|
| none | — | — | 418 | 72 | 54 |
| isopropyl alcohol | 1.0 | 0.0166 | 354 | 69 | 59 |
|  | 1.6 | 0.0266 | 306 | 27 | 48 |
|  | 3.2 | 0.0533 | 241 | 6 | 28 |
| octyl alcohol | 2.25 | 0.0173 | 322 | 20 | 46 |
| lauryl alcohol | 1.55 | 0.0083 | 322 | 48 | 56 |
|  | 2.28 | 0.0122 | 257 | 41 | 57 |
|  | 5.00 | 0.0268 | 274 | — | 48 |
| propylene glycol | 0.47 | 0.0124 | 224 | 26 | 49 |
| silanol containing polysiloxane* | 4.2 | 0.0080 | 282 | 64 | 59 |

*Comparative example

EXAMPLE 2

A different first composition was prepared by mixing together 62.4 parts of the dimethylvinylsiloxy endblocked polydimethylsiloxane of Example 1, 37.5 parts of the ground quartz of Example 1, and 0.13 part of the platinum catalyst. This composition is similar to the first composition of Example 1, but the benzene soluble resin copolymer is replaced by additional polydimethylsiloxane.

Samples were prepared by mixing 100 g of the above first composition with 18 g of the second composition of Example 1 and the amounts of lauryl alcohol shown in Table II and the mixture was allowed to foam and cure as in Example 1.

Samples were measured for density as in Example 1 with the results shown in Table II. The addition of lauryl alcohol lowered the density of the foam and the Bashore resiliency.

TABLE II

| Amount of lauryl alcohol, gm | Density, kg/m³ | Compressibility kPa | Bashore |
|---|---|---|---|
| none | 306 | — | 55 |
| 2.33 | 241 | 7.4 | 24 |

EXAMPLE 3

A first and second composition were prepared as in Example 1.

A series of samples were prepared by mixing 100 g of the first composition with the amount and type of additive shown in Table III. Each of these mixtures was then mixed with 18 g of the second composition for 30 to 60 seconds and the mixture was allowed to froth and cure to a foam at room temperature.

Samples were removed from each of the closed-cell foams and measured for density, compressibility, and Bashore resiliency with the results shown in Table III.

At an additive level sufficient to give 0.008 mols of hydroxyl radical, the lauryl alcohol and the silanol containing polysiloxane gave comparable Bashore resiliency values, but the density and compressibility of the silanol containing polysiloxane sample was appreciably higher than that of the lauryl alcohol. The properties of the foams containing the silanol containing polysiloxane did not change greatly as the amount was varied, whereas the lauryl alcohol caused a variation in compressibility but little change in density or Bashore resiliency as the amount was varied.

TABLE III

| Additive | Amount gms | mol OH | Density kg/m$^3$ | Compressibility kPa | Bashore Resiliency |
|---|---|---|---|---|---|
| none | — | — | 484 | 101 | 57 |
| lauryl alcohol | 1.55 | 0.0083 | 282 | 58 | 60 |
|  | 2.28 | 0.0122 | 276 | 40 | 59 |
|  | 3.50 | 0.0187 | 276 | 32 | 56 |
| propylene glycol | 0.47 | 0.0124 | 321 | 45 | 49 |
| 2-ethylhexanediol | 0.90 | 0.0123 | 321 | 44 | 47 |
| silanol containing | 4.2 | 0.0080 | 355 | 79 | 60 |
| polysiloxane | 6.2 | 0.0118 | 352 | 75 | 59 |
|  | 9.5 | 0.0181 | 373 | 88 | 61 |

EXAMPLE 4

A first composition was prepared by mixing 60 parts of the first composition of Example 1 and 40 parts of the dimethylvinylsiloxy endblocked polydimethylsiloxane of Example 1. This produced a first composition similar to that of Example 1 but having a lower ratio of resin copolymer, filler, and catalyst to polymer than in Example 1.

A series of samples were prepared by mixing 100 g of the above first composition, with the amount of 2-ethylhexanediol shown in Table IV, then adding 20 g of the second composition of Example 1. In the first two samples, each mixture was allowed to froth and cure to a foam at room temperature. The third sample was allowed to froth for two minutes at room temperature, then was placed in an air-circulating oven at 130° F. for 5 minutes. The fourth sample was allowed to froth for 2 minutes at room temperature, then was placed in an air-circulating oven at 130° F. for 20 minutes.

The 2-ethylhexanediol produced a very soft, compressible foam in this formulation.

TABLE IV

| Amount of ethylhexanediol | | Density | Compressibility | Bashore |
| gms | mol OH | kg/m$^3$ | kPa | Resiliency |
|---|---|---|---|---|
| 0 | 0 | 333 | 32 | 68 |
| 2.0 | 0.027 | 214 | 6.6 | 34 |
| 0 | 0 | 407 | 24.7 | 55 |
| 2.0 | 0.027 | 247 | 3.0 | 22 |

That which is claimed is:

1. A method of controlling a combination of physical properties of a silicone elastomeric foam consisting essentially (A) Mixing
(1) 100 parts by weight of triorganosiloxy endblocked polydiorganosiloxane having a viscosity in the range of 20 to 40 Pa.s at 25° C. and at least two vinyl radicals per molecule,
(2) from 0 to 40 parts by weight of a benzene soluble resin copolymer of triorganosiloxy and SiO$_2$ units where the triorganosiloxy units are trimethylsiloxy units and dimethylvinyl units and the mol ratio of triorganosiloxy units to SiO$_2$ units is about 0.7 to 1 and the copolymer has from 1.4 to 2.2 weight percent silicon-bonded vinyl radical,
(3) from 5 to 200 parts by weight of platinum per million parts by weight of polydiorganosiloxane (1) as catalyst,
(4) from 5 to 10 parts by weight of organohydrogensiloxane having an average of at least 3 silicon-bonded hydrogen atoms per molecule and an average of no more than one silicon-bonded hydrogen atom per silicon atom,
(5) from 20 to 40 parts by weight of hydroxyl endblocked polydiorganosiloxane having from 2 to 4 weight percent hydroxyl radical,
(6) from 0 to 100 parts by weight of filler, and then (B) adding
(7) from 1 to 15 parts by weight of organic alcohol having from 3 to 12 carbon atoms to change the ratio of density to compressibility of the resultant foam, the mixture having a viscosity of less than 100 Pa.s at 25° C., and then (C) allowing the mixture to produce a froth and cure at room temperature into a closed-cell, elastomeric silicone foam.

2. The method of claim 1 in which (1) is a vinyl endblocked polydimethylsiloxane.

3. The method of claim 1 in which (4) is a copolymer of trimethylsiloxy, methylhydrogensiloxane, and dimethylsiloxane having an average of at least five silicon-bonded hydrogen atoms per molecule.

4. The method of claim 1 in which (7) is selected from the group consisting of isopropanol, octyl alcohol, lauryl alcohol, propylene glycol, and 2-ethylhexanediol.

5. The method of claim 1 in which the ingredients are stored in two parts, a first part containing the vinyl-containing polydiorganosiloxane (1) and the platinum catalyst (3) and a second part containing the organohydrogensiloxane (4), the hydroxyl endblocked polydiorganosiloxane (5), and the organic alcohol (7).

6. The method of claim 5 in which (1) is a vinyl endblocked polydimethylsiloxane, (4) is a copolymer of trimethylsiloxy, methylhydrogen siloxane, and dimethylsiloxane having an average of at least five silicon-bonded hydrogen atoms per molecule, and (7) is selected from the group consisting of isopropanol, octyl alcohol, lauryl alcohol, propylene glycol, and 2-ethylhexanediol.

* * * * *

UNITED STATES PATENT AND TRADEMARK OFFICE
CERTIFICATE OF CORRECTION

PATENT NO. : 4,590,222

DATED : May 20, 1986

INVENTOR(S) : Therese M. Bauman

It is certified that error appears in the above-identified patent and that said Letters Patent is hereby corrected as shown below:

Column 5, Line 53, "methylsiloxane siloxane having" should read ---"methylsiloxane having"---

Column 8, TABLE IV, "Amount of ethylhexanediol" should read "Amount of 2-ethylhexanediol"

Column 8, Line 13, "essentially" should read "essentially of"

Signed and Sealed this

Twenty-fourth Day of March, 1987

Attest:

DONALD J. QUIGG

Attesting Officer

Commissioner of Patents and Trademarks